US008605307B2

(12) United States Patent
Takano

(10) Patent No.: US 8,605,307 B2
(45) Date of Patent: Dec. 10, 2013

(54) METHOD AND DEVICE FOR COMMUNICATIONS WHICH USE A PLURALITY OF HOSTS

(75) Inventor: Tomohide Takano, Chiba (JP)

(73) Assignee: Ricoh Company, Limited, Tokyo (JP)

( * ) Notice: Subject to any disclaimer, the term of this patent is extended or adjusted under 35 U.S.C. 154(b) by 1083 days.

(21) Appl. No.: 12/389,539

(22) Filed: Feb. 20, 2009

(65) Prior Publication Data

US 2009/0225753 A1 Sep. 10, 2009

(30) Foreign Application Priority Data

Mar. 7, 2008 (JP) ................................. 2008-057679

(51) Int. Cl.
*G06F 3/12* (2006.01)
*H04W 24/00* (2009.01)

(52) U.S. Cl.
USPC ..... 358/1.15; 358/1.14; 455/456.1; 455/41.3; 455/41.1; 455/41.2; 455/404.2; 710/110; 710/36; 709/223; 709/227

(58) Field of Classification Search
USPC ......... 358/1.15, 1.14; 710/110; 709/227, 209; 455/456.1, 41.3, 41.1, 41.2, 404.2; 399/366
See application file for complete search history.

(56) References Cited

U.S. PATENT DOCUMENTS

| | | | | |
|---|---|---|---|---|
| 7,064,854 B2 * | 6/2006 | Idehara | ........................ | 358/1.15 |
| 7,478,188 B2 * | 1/2009 | Patton | ........................... | 710/300 |
| 7,644,211 B2 * | 1/2010 | Toebes et al. | ................. | 710/106 |
| 7,728,995 B2 * | 6/2010 | Noble | .......................... | 358/1.15 |
| 7,761,340 B2 * | 7/2010 | Yee et al. | ..................... | 705/26.1 |
| 7,937,514 B2 * | 5/2011 | Aytur et al. | .................... | 710/110 |
| 7,956,401 B2 * | 6/2011 | Lo et al. | ........................... | 257/310 |
| 7,965,401 B2 * | 6/2011 | Ishimaru | ...................... | 358/1.14 |
| 7,983,692 B2 * | 7/2011 | Koike | ......................... | 455/456.1 |
| 8,045,199 B2 * | 10/2011 | Oak | ............................. | 358/1.15 |
| 8,065,462 B2 * | 11/2011 | Chan et al. | .................... | 710/313 |
| 8,155,487 B2 * | 4/2012 | Irawan et al. | ................... | 385/12 |
| 8,155,587 B2 * | 4/2012 | Sasai et al. | .................. | 455/41.2 |

(Continued)

FOREIGN PATENT DOCUMENTS

| JP | 2002-189645 A | 7/2002 |
|---|---|---|
| JP | 2003-309486 A | 10/2003 |

(Continued)

OTHER PUBLICATIONS

Japanese Office Action Issued Sep. 4, 2012 in Patent Application No. 2008-057679.

(Continued)

*Primary Examiner* — Dennis Dicker
(74) *Attorney, Agent, or Firm* — Oblon, Spivak, McClelland, Maier & Neustadt, L.L.P.

(57) ABSTRACT

A communication device that communicates as a device with a plurality of hosts by using a communication interface that is designed to be used for a point-to-multipoint network on which a single host is connected to a plurality of devices, includes a control unit that controls to cause a disconnecting unit to disconnect the communication device from a destination host that is among the hosts capable of establishing a communication path with the communication device and is connected to the communication device using host identification information and device control information stored in a storage unit, and cause a connecting unit to connect the communication device to a next destination host from among the hosts to switch the hosts sequentially.

20 Claims, 6 Drawing Sheets

(56) References Cited

U.S. PATENT DOCUMENTS

| | | | |
|---|---|---|---|
| 8,264,709 B2* | 9/2012 | Okajima et al. | 358/1.14 |
| 8,274,677 B2* | 9/2012 | Asano | 358/1.15 |
| 2003/0232598 A1* | 12/2003 | Aljadeff et al. | 455/41.2 |
| 2003/0236064 A1* | 12/2003 | Shiohara et al. | 455/1 |
| 2004/0075860 A1* | 4/2004 | Shima et al. | 358/1.15 |
| 2004/0125163 A1* | 7/2004 | Shima et al. | 347/16 |
| 2005/0097271 A1* | 5/2005 | Davies et al. | 711/114 |
| 2005/0276253 A1* | 12/2005 | Ho et al. | 370/338 |
| 2006/0195552 A1* | 8/2006 | Nampei | 709/218 |
| 2007/0124436 A1* | 5/2007 | Shepherd | 709/223 |
| 2007/0283018 A1* | 12/2007 | Yun | 709/226 |
| 2008/0005432 A1* | 1/2008 | Kagawa | 710/106 |
| 2008/0022399 A1 | 1/2008 | Takano | |
| 2008/0024815 A1* | 1/2008 | Oak | 358/1.15 |
| 2010/0306424 A1* | 12/2010 | Akester | 710/36 |
| 2011/0002009 A1* | 1/2011 | Ohashi | 358/1.15 |
| 2011/0261405 A1* | 10/2011 | Ito et al. | 358/1.15 |

FOREIGN PATENT DOCUMENTS

| | | |
|---|---|---|
| JP | 2004-120693 A | 4/2004 |
| JP | 2007-251851 A | 9/2007 |
| JP | 2007-306057 | 11/2007 |
| JP | 4034323 | 11/2007 |

OTHER PUBLICATIONS

Office Action mailed on Jun. 25, 2013, in counterpart Japanese Appln No. 2008-057679 (1 page).

* cited by examiner

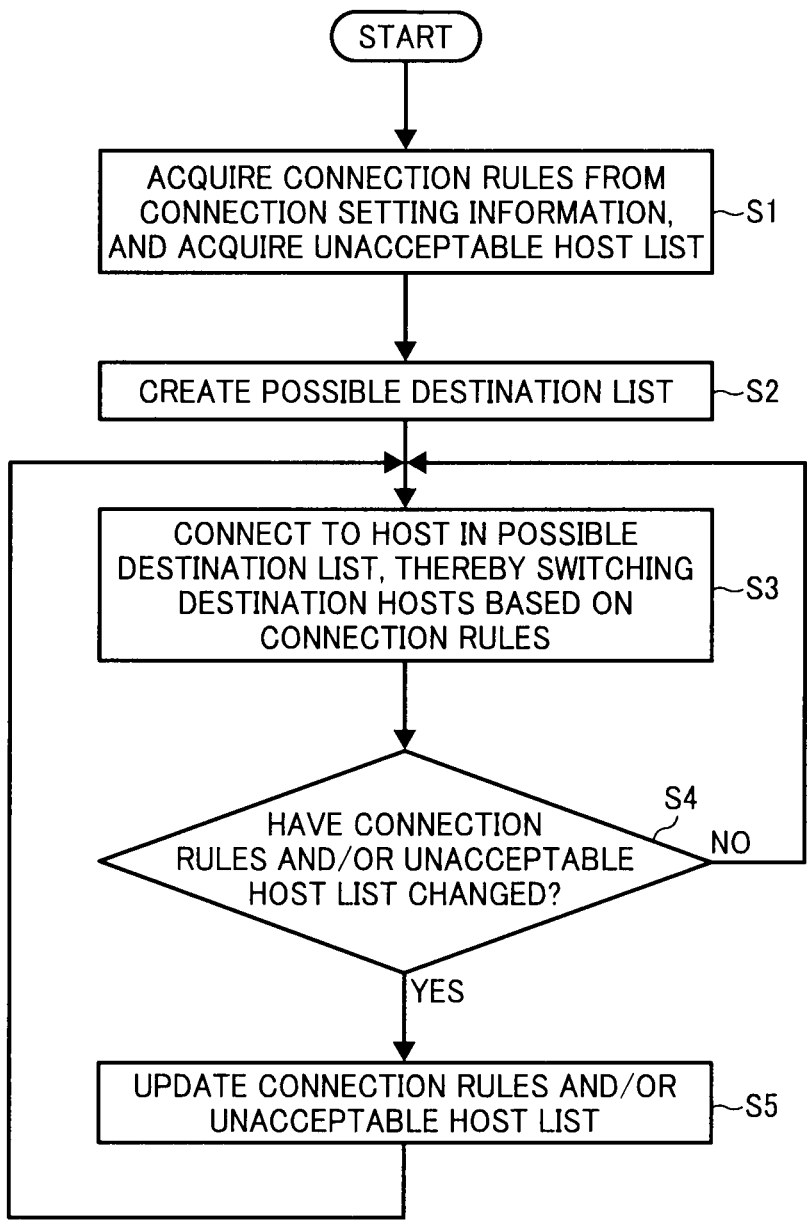

METHOD AND DEVICE FOR COMMUNICATIONS WHICH USE A PLURALITY OF HOSTS

CROSS-REFERENCE TO RELATED APPLICATIONS

The present application claims priority to and incorporates by reference the entire contents of Japanese priority document 2008-057679 filed in Japan on Mar. 7, 2008.

BACKGROUND OF THE INVENTION

1. Field of the Invention

The present invention relates to a technology for communications between communication devices via a communication interface.

2. Description of the Related Art

Most personal computers (PCs) include a general-purpose communication interface (I/F). By the presence of the general-purpose communication I/F, a user can connect various external devices to the PC, and use the PC on the network. A point-to-multipoint is a topology in which a single PC as a host is connected to a plurality of devices. A typical device is, for example, a printer. Some printers give strict priorities to buses in consideration of data transfer capability of the buses, thereby transferring data efficiently, which is disclosed in, for example, Japanese Patent Application Laid-open No. 2005-333676. In most cases, a single printer is shared by a plurality of PCs.

However, in the point-to-multipoint connection that is designed for connecting a single host to a plurality of devices, it is difficult to connect the plural PCs as the hosts to the single printer as the device. Therefore, in the point-to-multipoint connection that is designed for connecting a single host to a plurality of devices, there is necessity of improving usability in connection.

SUMMARY OF THE INVENTION

It is an object of the present invention to at least partially solve the problems in the conventional technology.

According to an aspect of the present invention, there is provided a communication device that communicates as a device with a plurality of hosts by using a communication interface that is designed to be used for a point-to-multipoint network on which a single host is connected to a plurality of devices, the communication device includes a storage unit that stores therein a host identification information that is received, in establishing connections with the hosts, from the hosts for identifying each of the hosts, and a device control information that is used for uniquely identifying the communication device; a connecting unit that connects the communication device to a destination host from among the hosts capable of establishing a communication path with the communication device by establishing the communication path to the destination host using the host identification information and the device control information; a disconnecting unit that disconnects the communication device from the destination host; and a control unit that controls to cause the disconnecting unit to disconnect the communication device from the destination host and cause the connecting unit to connect the communication device to a next destination host from among the hosts to switch the hosts sequentially.

According to another aspect of the present invention, there is provided a communication method that is configured to be executed in a communication device that communicates as a device with a plurality of hosts by using a communication interface that is designed to be used for a point-to-multipoint network on which a single host is connected to a plurality of devices, the communication method including storing a host identification information that is received, in establishing connections with the hosts, from the hosts for identifying each of the hosts, and a device control information that is used for uniquely identifying the communication device; connecting the communication device to a destination host from among the hosts capable of establishing a communication path with the communication device by establishing the communication path to the destination host using the host identification information and the device control information; disconnecting the communication device from the destination host; and controlling to disconnect the communication device from the destination host at the disconnecting and to connect the communication device to a next destination host from among the hosts at the connecting to switch the hosts sequentially.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 8 is a flowchart of a communication process performed by the image forming apparatus.

DETAILED DESCRIPTION OF THE PREFERRED EMBODIMENTS

Exemplary embodiments of the present invention are described in detail below with reference to the accompanying drawings.

Figure 1:
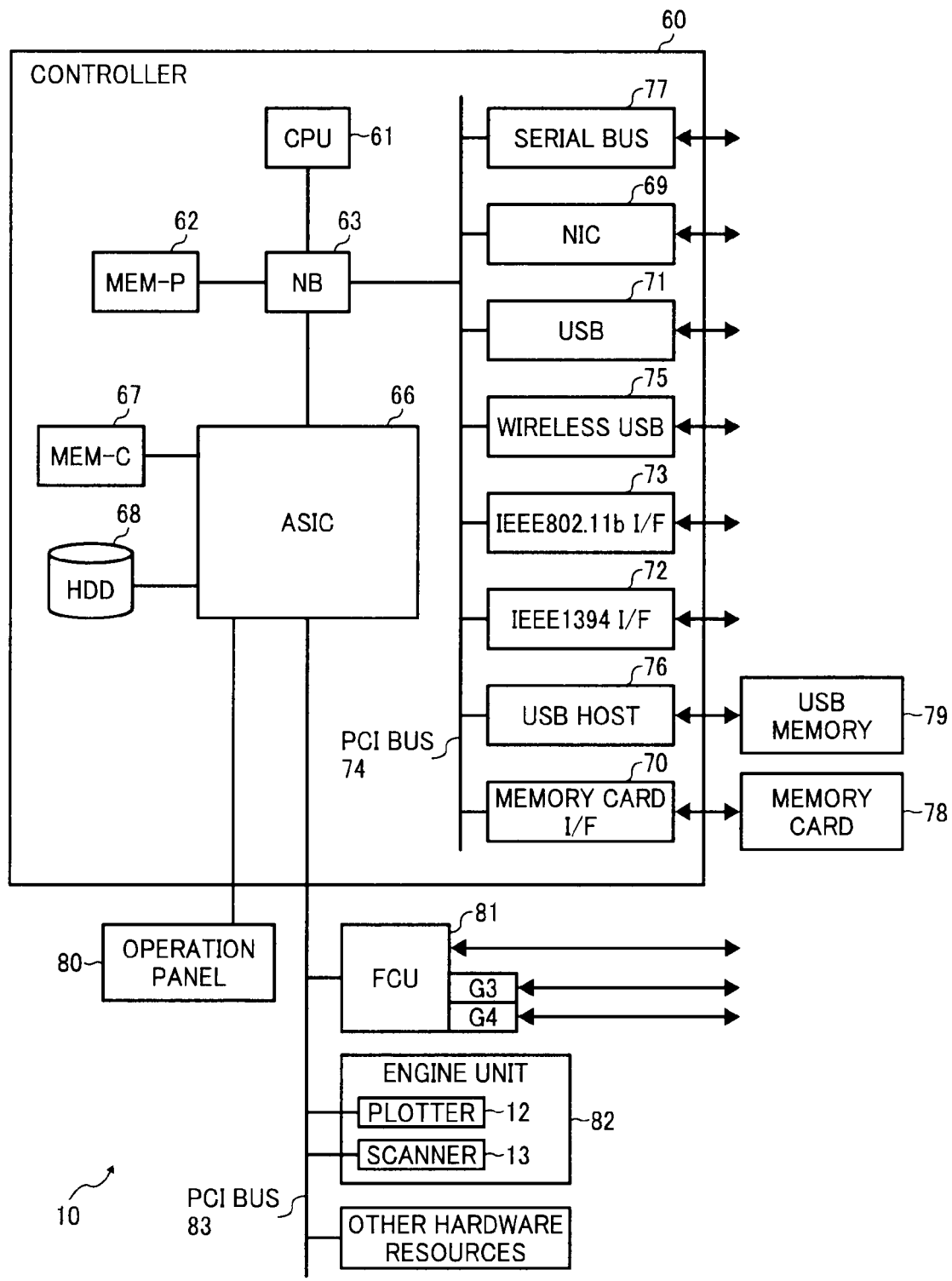
FIG. 1 is a block diagram of a hardware configuration of an image forming apparatus according to an embodiment of the present invention.

FIG. 1 is a block diagram of a hardware configuration of an image forming apparatus 10 according to an embodiment of the present invention. The image forming apparatus 10 includes a controller 60, an operation panel 80, a facsimile control unit (FCU) 81, and an engine unit 82. The controller 60 includes a central processing unit (CPU) 61, a system memory (MEM-P) 62, a north bridge (NB) 63, an application specific integrated circuit (ASIC) 66, a local memory (MEM-C) 67, a hard disk drive (HDD) 68, a network interface card (NIC) 69, a memory card I/F 70, a universal serial bus (USB) 71, an IEEE1394 I/F 72, an IEEE802.11b I/F 73, a wireless USB 75, a USB host 76, and a serial bus 77.

The operation panel 80 is connected to the ASIC 66. The FCU 81 and the engine unit 82 are connected to the ASIC 66 via a PCI bus 83. In the controller 60, the ASIC 66 is connected to the MEM-C 67 and the HDD 68. The ASIC 66 is connected to the CPU 61 via a chipset for the CPU 61, i.e., the NB 63. Because the CPU 61 and the ASIC 66 are connected to each other via the NB 63, the controller 60 can operate even if an interface of the CPU 61 is undisclosed.

The NB 63 is a bridge that connects the CPU 61, the MEM-P 62, the ASIC 66, the NIC 69, the memory card I/F 70, the USB 71, the IEEE1394 I/F 72, the IEEE802.11b I/F 73, the wireless USB 75, the USB host 76, and the serial bus 77 to each other. The NIC 69, the memory card I/F 70, the USB 71, the IEEE1394 I/F 72, the IEEE802.11b I/F 73, the wireless USB 75, the USB host 76, and the serial bus 77 are connected to the NB 63 via a PCI bus 74.

The CPU 61 controls the image forming apparatus 10 and implements various functions by reading various software programs from the MEM-P 62, the MEM-C 67, and the HDD 68 via the NB 63, and running the acquired software programs.

The MEM-P 62 stores therein drawing data, etc. The MEM-C 67 is used as a buffer that stores therein copy images and codes. The ASIC 66 is an integrated circuit specific to image processing, and includes a hardware component for the image processing. The HDD 68 is an auxiliary storage device that stores therein various data such as image data, document data, software programs, and font-data forms.

The NIC 69 is an interface that connects the image forming apparatus 10 to a network. The memory card I/F 70 controls communications between the image forming apparatus 10 and a memory card 78 that is detachably attached to the image forming apparatus 10. The USB 71, the IEEE1394 I/F 72, the IEEE802.11b I/F 73, the wireless USB 75, and the serial bus 77 are interfaces supported by different standards. For example, the wireless USB 75 is supported by wireless-USB standards. The wireless-USB standards are extended from USB standards to apply USBs to wireless communications. The USB host 76 controls communications between the image forming apparatus 10 and a USB memory 79 that is detachably attached to the image forming apparatus 10.

The operation panel 80 receives various instructions from a user, and displays a notice for the operator. The engine unit 82 includes a plotter 12, a scanner 13, and an engine control board 43 (not shown in FIG. 1) as units that process images. The plotter 12 can be, for example, a black-and-white plotter, a color plotter with a single drum, and a color plotter with four drums. The scanner 13 scans an original on a scanning position, and reads an image from the original. The engine control board 43 controls the engine unit 82 under control of the CPU 61. The FCU 81 controls facsimile communications, and includes a memory (not shown). The memory of the FCU 81 is used to temporarily store therein facsimile data that has been received while the power of the image forming apparatus 10 is OFF.

Figure 2:
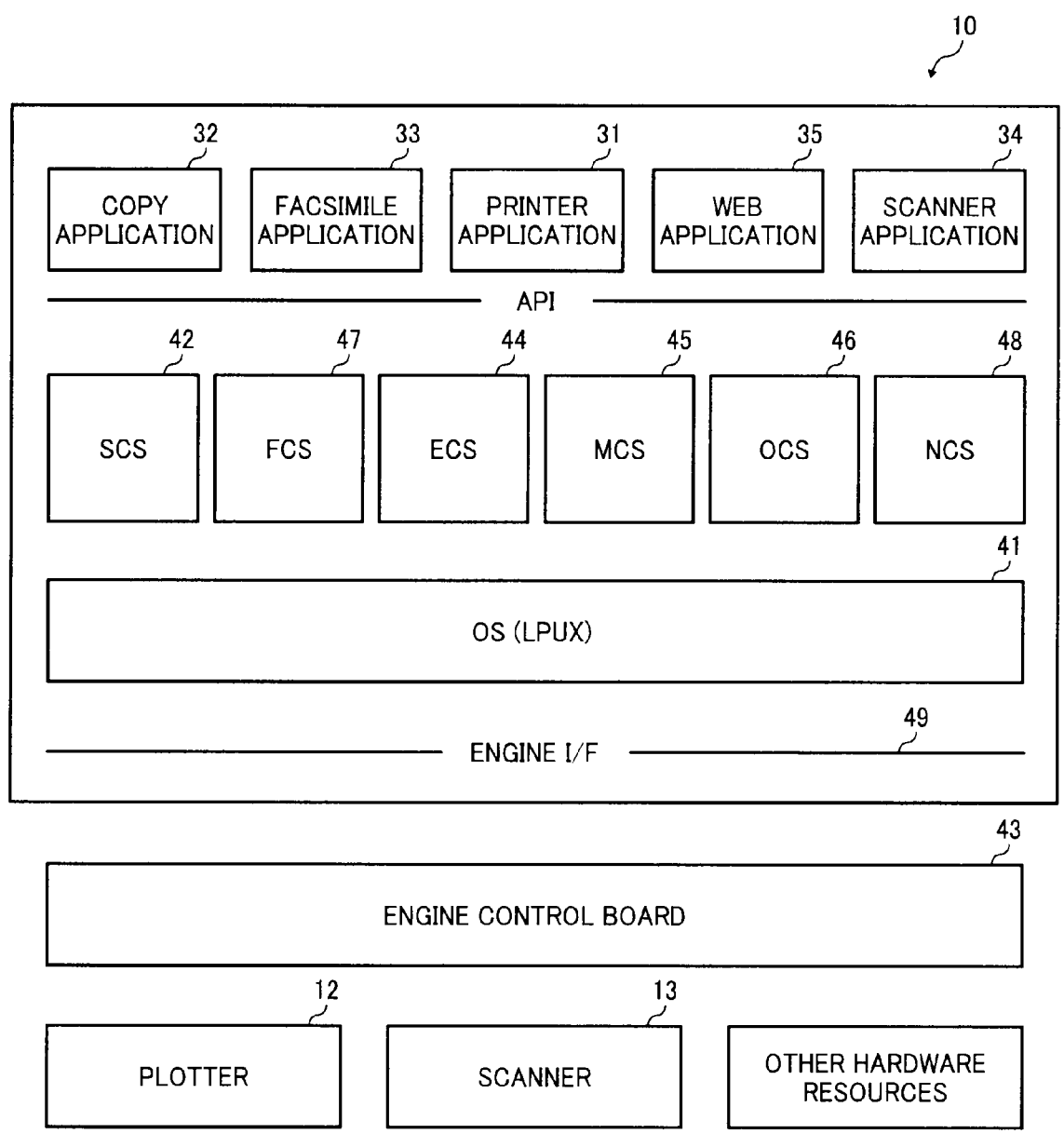
FIG. 2 is a block diagram of a software configuration of the image forming apparatus.

FIG. 2 is a block diagram of a software configuration of the image forming apparatus 10. The image forming apparatus 10 includes, as applications, a printer application 31, a copy application 32, a facsimile application 33, a scanner application 34, and a Web application 35. The image forming apparatus 10 includes, as control services, a system control service (SCS) 42, an engine control service (ECS) 44, a memory control service (MCS) 45, an operation-unit control service (OCS) 46, a facsimile control service (FCS) 47, and a network control service (NCS) 48. The image forming apparatus 10 includes, as control modules, an operating system (OS) 41 and an engine I/F 49. Those applications, services, and modules are present as the various software programs stored in the MEM-P 62, the MEM-C 67, and the HDD 68. The following various functions are implemented by reading those software programs and executing the acquired software programs by the CPU 61.

The printer application 31 is a software program for a printer that is supported by a page-description language (PDL) such as PostScript (PS) or a printer control language (PCL). The copy application 32 is a software program for copying. The facsimile application 33 is a software program for a facsimile. The scanner application 34 is a software program for a scanner. The Web application 35 is a software program for a network.

The OS 41 can be, for example, LPUX (registered trademark). The OS 41 executes various applications as processes in parallel. The engine I/F 49 controls the engine unit 82 via the engine control board 43. The engine control board 43 is included in the engine unit 82.

The SCS 42 is in charge of various processes such as management of the software programs, control and screen display of the operation panel 80, display of light-emitting diodes (LEDs), management of the hardware sources, and control of software interrupts. The ECS 44 is in charge of, under control of the engine control board 43, processes of controlling the engine unit 82, more particularly, the plotter 12 and the scanner 13.

The MCS 45 is in charge of memory control such as acquisition and release of memory for the images, usage of the HDD 68, and compression and decompression of the image data. The OCS 46 is in charge of a process of controlling the operation panel 80. The FCS 47 is in charge of various facsimile processes of providing application programming interfaces (APIs) such as for sending/receiving of facsimile data to/from software layers of the system controllers via a public switched telephone network (PSTN) or an integrated services digital network (ISDN), writing/reading of facsimile data to/from the backup memory, scanning of facsimile data, receiving and printing of facsimile data, and combining of facsimile communications with other data communications.

The NCS 48 is in charge of a process of providing services that can be shared to software programs requiring a network input/output (I/O). In other words, the NCS 48 is used to sort data that is received via the network under a certain protocol to a proper software unit, or operate between the software unit and the network so that data is sent from the software unit to the network. For example, the NCS 48 controls data communications between devices that are connected to each other via a network by using a hyper text transfer protocol daemon (httpd) under a hyper text transfer protocol (HTTP).

In this manner, the CPU 61 runs various services such as the SCS 42, the ECS 44, the MCS 45, the OCS 46, the FCS 47, and the NCS 48 on the OS 41 as various processes, and also runs various applications such as the printer application 31, the copy application 32, the facsimile application 33, the scanner application 34, and the Web application 35 appropriately, thereby implementing various functions.

Figure 3:
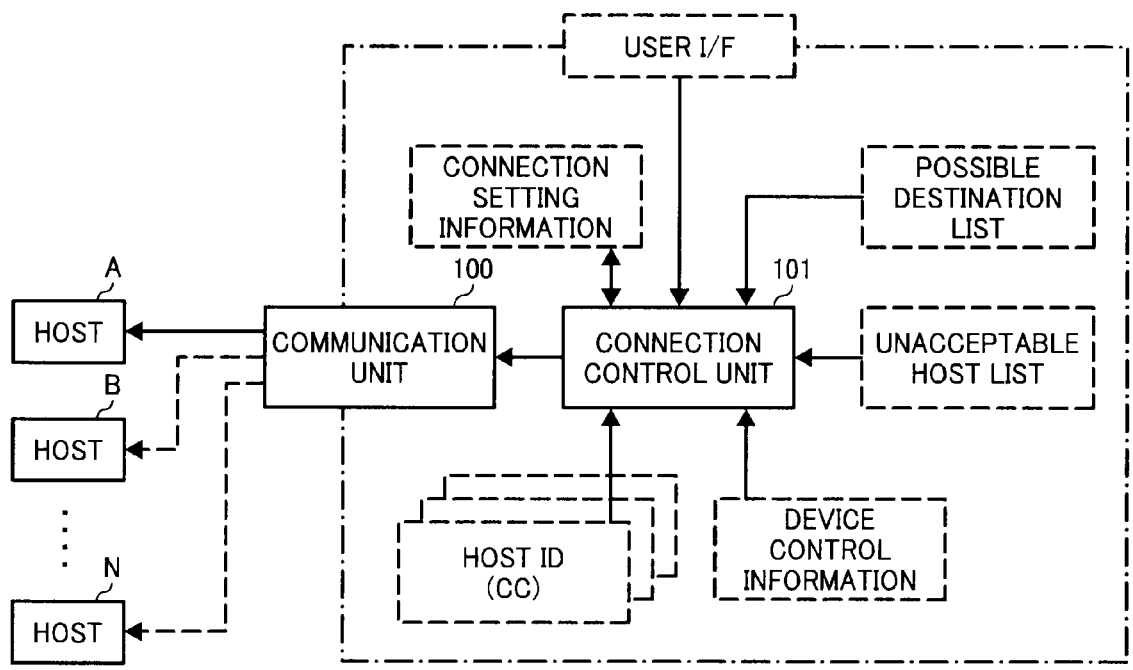
FIG. 3 is a block diagram for explaining salient features of an NCS and an OS shown in FIG. 2.

Salient features of the present embodiment implemented by the NCS 48 and the OS 41 are described with reference to FIG. 3. The salient features are, in short, functions of a communication unit 100 and a connection control unit 101. Under control of the connection control unit 101, the communication unit 100 establishes a connection with any one of a plurality of hosts A, B, . . . , N as a destination host and cuts off the connection by using a communication I/F that is designed for the point-to-multipoint network on which a single host is connected to a plurality of devices, thereby switching the destination hosts. The hosts A, B, . . . , N can be, for example, PCs, mobile terminals, and digital cameras. Assume in the present embodiment that a wireless USB is used as the communication I/F.

The connection control unit 101 causes the communication unit 100 to connect/disconnect the image forming apparatus 10 to/from the hosts. More particularly, the connection control unit 101 creates, by referring to connection setting information and an unacceptable host list, a possible destination list including hosts having possibility to be connected. The connection control unit 101 selects a host to be connected (hereinafter, "next destination host") from among the hosts in the possible destination list. The connection control unit 101 then sends to the communication unit 100 a request to cut off the connection with the host that is currently being connected (hereinafter, "current destination host") and establish a new connection with the next destination host, by sending along with a host ID of the next destination host and device control information of the image forming apparatus 10. The host ID is information for identifying each host. The image forming apparatus 10 receives the host ID from the destination host through association to establish a communication path between the image forming apparatus 10 and the destination host. The host ID is equivalent to a connection context (CC) in the present embodiment. The device control information is an identifier for uniquely identifying the image forming apparatus 10 as the device. The device control information is equivalent to a connection device ID (CDID) in the embodiment. The image forming apparatus 10 stores the host IDs that were received through the previous associations and the device control information in a memory such as the MEM-P 62. If it is necessary to establish a connection with the host again, the image forming apparatus 10 establishes the connection path to the host by using the host ID and the device control information stored in the memory.

The connection setting information is connection rules. The connection rules are used for establishing/cutting-off the connections with the hosts. More particularly, the connection rules include information indicative of whether the destination hosts are to be switched periodically, interval at which the destination hosts are to be switched periodically, and information for identifying, if the next destination host is specified, the specified host (e.g., host name), which is set in advance and can be appropriately changed in accordance with instructions input by a user via the operation panel 80 as a user interface. The connection setting information is stored in, for example, the MEM-P 62, and can be changed as appropriate via the user interface.

The unacceptable host list includes hosts that are not allowed to be connected to the image forming apparatus 10 (hereinafter, "unacceptable hosts"). The unacceptable host list is created based on various instructions received from the user via the operation panel 80. The possible destination list including the hosts having possibility to be connected is created by referring to the unacceptable host list. The unacceptable host list and the possible destination list are stored, for example, in a form of parameters of programs.

FIGS. 4 to 7 are schematic diagrams of examples of user I/F screens appearing on the operation panel 80. The user can input an instruction for switching the destination hosts via the user I/F screen shown in FIG. 4. In other words, the user can switch the destination hosts at desired timing by inputting this instruction. The user can input an instruction for specifying a desired host from among the hosts in the possible destination list as the next destination host via the user I/F screen shown in FIG. 5. In other words, the user can switch to the desired host at desired timing by inputting this instruction. The user can input an instruction for specifying the interval at which the destination hosts are to be switched periodically via the user I/F screen shown in FIG. 6. If the interval is set, the destination hosts are switched automatically at the specified interval without manual operations by the user. In other words, the single image forming apparatus 10 as the device is shared by the plural hosts by switching the destination hosts automatically. The user can input an instruction for specifying the unacceptable host via the user I/F screen shown in FIG. 7. In other words, the user can specify the hosts having possibility to be selected for connection by inputting this instruction. For example, the user can cause the image forming apparatus 10 not to be connected to a problematic host from viewpoint of security. This improves efficiency and security in the data transfer.

Upon receiving any of the instructions via any of the user I/F screens shown in FIGS. 4 to 7, the connection control unit 101 changes the connection setting information or the unacceptable host list as appropriate based on the received instruction, and updates the possible destination list in response to the changing of the connection setting information or the unacceptable host list.

The communication process performed by the image forming apparatus 10 according to the present embodiment is described with reference to FIG. 8. The connection control unit 101 acquires the connection rules by reading the connection setting information, and acquires the unacceptable host list (Step S1). The connection control unit 101 creates the possible destination list by selecting hosts that are not in the acquired unacceptable host list among hosts capable of establishing a communication path with the image forming apparatus 10 based on the connection rules and the unacceptable host list (Step S2). The hosts in the possible destination list are arranged in order based on a certain or predetermined manner. The connection control unit 101 selects the next destination host from among the hosts in the possible destination list based on the connection rules, and sends the host ID of the next destination host and the device control information of the image forming apparatus 10 to the communication unit 100 to request the communication unit 100 to establish the connection with the next destination host. Upon receiving the request, the communication unit 100 establishes the communication path to the next destination host that is selected by the connection control unit 101 by using the received host ID and the device control information, thereby connecting the image forming apparatus 10 to the next destination host (Step S3).

After that, the connection control unit 101 selects a host different from the host with which the connection is established at the last time (hereinafter, "latest destination host") from among the hosts in the possible destination list as the next destination host. More particularly, the connection control unit 101 selects a host that is arranged in the possible destination list next to the latest destination host as the next destination host. The connection control unit 101 sends the host ID of the next destination host and the device control information of the image forming apparatus 10 to the communication unit 100 to request the communication unit 100 to establish the connection with the next destination host.

Assume, for example, that it is determined on the connection rules that the destination hosts are to be switched periodically at the interval of 60 milliseconds (ms). The connection control unit 101 selects the host that is arranged in the possible destination list next to the latest destination host as the next destination host at every 60 ms.

Upon receiving the request, the communication unit 100 cuts off the connection with the current destination host, and establishes the connection path to the next destination host that is selected by the connection control unit 101 by using the received host ID and the received device control information, thereby connecting the image forming apparatus 10 to the next destination host (Step S3). As a result, the destination hosts are switched.

The connection control unit 101 repeats the process in Step S3 based on the connection rules, thereby switching the destination hosts repeatedly. The connection control unit 101 sequentially selects the next destination host from among the hosts in the possible destination list.

When the connection with the current destination host is cut off because of, for example, moving of the current destination host to outside a coverage area, the connection control unit 101 selects the host that is arranged in the possible destination list next to the latest destination host as the next destination host immediately even before an end of the interval. The communication unit 100 then tries to establish the connection with the next destination host.

Upon receiving any of the instructions via any of the user I/F screens shown in FIGS. 4 to 7 (Yes at Step S4), the connection control unit 101 changes the connection setting information or the unacceptable host list as appropriate based on the received instruction, and updates the possible destination list in response to the changing of the connection setting information or the unacceptable host list (Step S5). Thereafter, the process control returns to Step S3.

Figure 4:
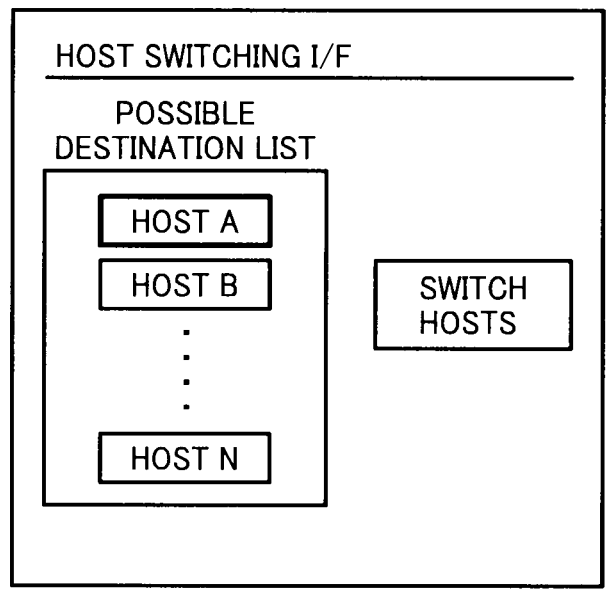
FIGS. 4 to 7 are schematic diagrams of examples of user I/F screens appearing on an operation panel shown in FIG. 1.

If, for example, the connection control unit 101 receives the instruction for switching the destination hosts via the user I/F screen shown in FIG. 4, the connection control unit 101 selects a host that is different from the latest destination host as the next destination host at Step S3.

Figure 5:
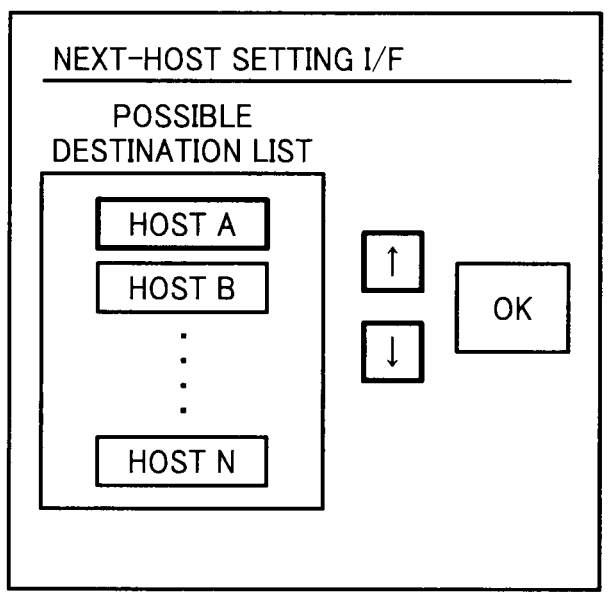

If the connection control unit 101 receives the instruction for specifying the next destination host from among the hosts in the possible destination list via the user I/F screen shown in FIG. 5, the connection control unit 101 selects the specified host as the next destination host, and sends the request to establish the connection with the next destination host to the communication unit 100 at Step S3.

Figure 6:
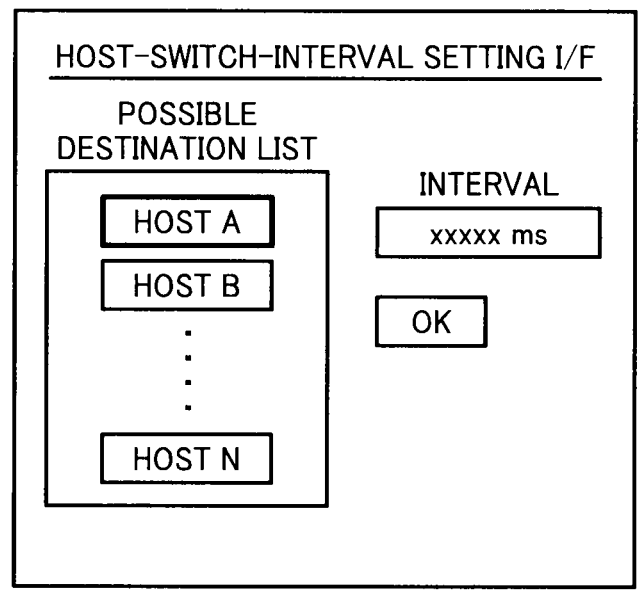

If the connection control unit 101 receives the instruction for specifying the interval via the user I/F screen shown in FIG. 6, the connection control unit 101 changes the interval that is determined on the connection rules to the specified value. After the changing is completed, the connection control unit 101 selects a host in the possible destination list that is different from the latest destination host as the next destination host and sends the request to establish the connection with the next destination host to the communication unit 100 at Step S3 at every changed interval.

Figure 7:
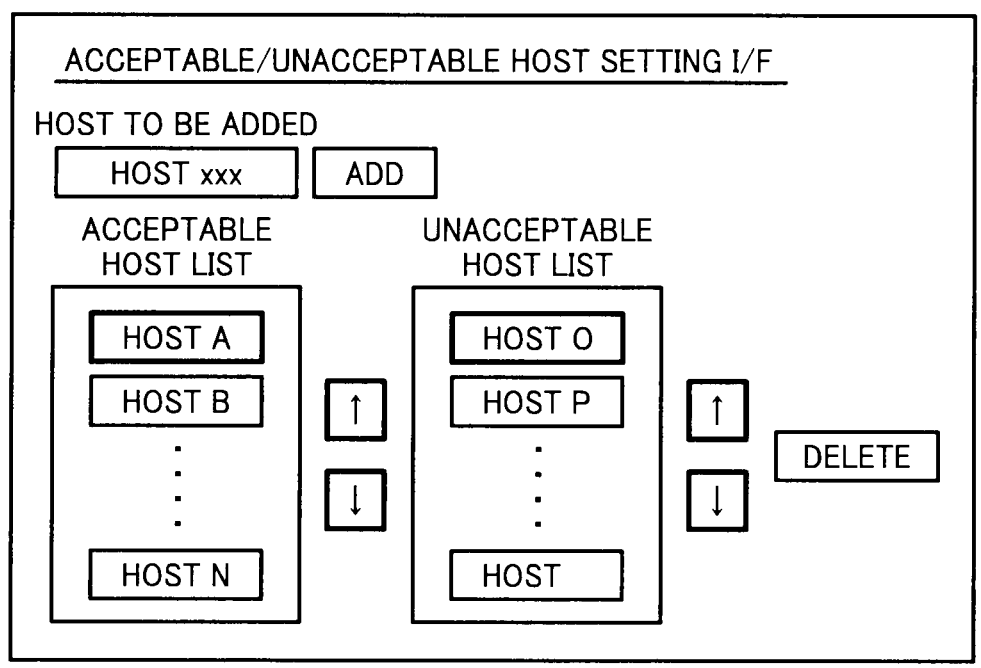

If the connection control unit 101 receives the instruction for adding/deleting a specific host to/from the unacceptable host list via the user I/F screen shown in FIG. 7, the connection control unit 101 adds/deletes the specific host to/from the unacceptable host list. The connection control unit 101 then updates the possible destination list based on the updated unacceptable host list. After that, the connection control unit 101 selects the next destination host from the updated possible destination list based on the connection rules, and sends the request to establish the connection with the next destination host to the communication unit 100 at Step S3.

In this manner, even by using the communication I/F that is designed to be used for the point-to-multipoint network on which a single host is connected to a plurality of devices, it is possible to share the image forming apparatus 10 as a single device by the plural hosts in the easy manner by switching the destination hosts.

Moreover, if the mode in which the destination hosts are to be switched periodically is selected, the destination hosts are switched automatically without receiving the instruction from the user. The user can specify the interval in consideration of the usage environment of the user in settings for this mode. This makes it possible to set efficient switching conditions.

Furthermore, the connection control unit 101 creates the possible destination list once instead of determining the hosts having possibility to be connected each time the destination hosts are switched. This reduces the processing load.

Moreover, because the user can issue the explicit instruction for switching the destination hosts, it is possible to switch the destination hosts at proper timing.

Furthermore, because the user can specify the desired host from the possible destination list as the next destination host, it is possible to connect to the destination host in an efficient manner.

Moreover, the user can decide the hosts having possibility to be selected for connection by specifying the unacceptable host. This improves efficiency and security in the data transfer.

The various software programs executed by the image forming apparatus 10 can be stored in a computer connected to the image forming apparatus 10 via a network such as the Internet, and downloaded to the image forming apparatus 10 via the network. The various software programs can be stored in a form of a file that is installable and executable on a computer, in a recording medium readable by the computer, such as a compact disk-read only memory (CD-ROM), a flexible disk (FD), a compact disk-recordable (CD-R), and a digital versatile disk (DVD).

Although the image forming apparatus 10 is used as the communication device in the above embodiments, it is allowable to use any communication devices such as a copier, a printer, and a facsimile instead of the image forming apparatus 10 as the device.

The communication unit 100 can be configured to receive the request to cut off the connection from the host, and cut off the connection in response to the received request at Step S3. With this configuration, it is unnecessary to wait the instruction from the user for switching the destination hosts, because the destination hosts are switched in response to the request from the host.

The interval at which the destination hosts are switched periodically can be extended based on communication usage information. The communication usage information indicates communication relation between the image forming apparatus 10 and each of the hosts. Examples of the communication usage information include communication frequency, communication time, and communication interval. With this configuration, the efficiency in use of the communication device can be improved.

The host that is arranged in the possible destination list next to the latest destination host is selected as the next destination host in the above embodiment. However, the next destination host can be selected in any manner, for example, randomly so that the latest destination host is not selected as the next destination host.

The image forming apparatus 10 can be configured to include a measuring unit that measures a distance between the image forming apparatus 10 and the hosts capable of establishing the communication path with the image forming apparatus 10, and select a host having a shorter distance from the image forming apparatus 10 as the destination host in the possible destination list. With this configuration, the connection control unit 101 selects the hosts sequentially in an ascending order of the measured distance. Therefore, the image forming apparatus 10 tries to establish the connection with the host that is likely to have a higher connection demand.

The image forming apparatus 10 can be configured to receive an instruction for specifying the order of the hosts in the possible destination list from the user. With this configuration, because the user can set the order of the hosts based on the connection priority, it is possible to switch the destination hosts efficiently.

The wireless USB is used as the communication I/F that is designed to be used for the point-to-multipoint network on which a single host is connected to a plurality of devices. However, any general-purpose communication I/F for wire communications or wireless communications can be used.

According to an aspect of the present invention, it is possible to easily establish a network on which a plurality of hosts is connected to a single device by using a communication I/F that is designed to be used for a point-to-multipoint network on which a single host is connected to a plurality of devices.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A communication device that communicates as a device with a plurality of hosts, the communication device comprising:
   a connecting unit that connects the communication device to a destination host from among the hosts capable of establishing a communication path with the communication device by establishing the communication path to the destination host using host identification information that is received, in establishing connections with the host, from the host for identifying each of the hosts, and device control information that is used for uniquely identifying the communicating device;
   a disconnecting unit that disconnects the communication device from the destination host;
   a control unit that controls to cause the disconnecting unit to disconnect the communication device from the destination host and cause the connecting unit to connect the communication device to a next destination host from among the hosts to switch the hosts sequentially; and
   a creating unit that creates a possible destination list information including the hosts capable of establishing the communication path with the communication device, wherein:
   the connecting unit selects a host from among the hosts in the possible destination list information as the next destination host, and connects the communication device to the next destination host, and
   the creating unit creates the possible destination list information so that the hosts are arranged in an ascending order of a distance between the communication device and each of the hosts capable of establishing the communication path with the communication device.

2. The communication device according to claim 1, further comprising a request receiving unit that receives a request from the destination host, wherein
   when the request receiving unit receives a request for disconnecting the communication device from the destination host, the disconnecting unit disconnects the communication device from the destination host.

3. The communication device according to claim 1, wherein the disconnecting unit periodically disconnects the communication device from the destination host.

4. The communication device according to claim 3, wherein the disconnecting unit extends an interval at which the destination host is disconnected periodically based on communication usage information indicative of communication relation between the communication device and each of the hosts.

5. The communication device according to claim 3, further comprising an instruction receiving unit that receives an instruction from a user, wherein
   when the instruction receiving unit receives an instruction for specifying an interval at which the destination host is disconnected periodically, the disconnecting unit disconnects the communication device from the destination host every time specified interval passes.

6. The communication device according to claim 1, further comprising an instruction receiving unit that receives an instruction from a user, wherein
   when the instruction receiving unit receives an instruction for switching the hosts, the disconnecting unit disconnects the communication device from the destination host based on received instruction.

7. The communication device according to claim 1, wherein
   the creating unit creates the possible destination list information including the hosts that are arranged in a certain order based on a predetermined manner, and
   the connecting unit selects a host from among the hosts in the possible destination list information based on the certain order as the next destination host, and connects the communication device to the next destination host.

8. The communication device according to claim 1, further comprising an instruction receiving unit that receives an instruction from a user, wherein
   when the instruction receiving unit receives an instruction for specifying a host from among the hosts in the possible destination list information as the next destination host, the connecting unit selects specified host as the next destination host, and connects the communication device to the next destination host.

9. The communication device according to claim 7, further comprising an instruction receiving unit that receives an instruction from a user, wherein
   when the instruction receiving unit receives an instruction for changing the certain order, the creating unit updates the possible destination list information so that the hosts are arranged in an order based on received instruction.

10. The communication device according to claim 1, further comprising an instruction receiving unit that receives an instruction from a user, wherein
    when the instruction receiving unit receives an instruction for specifying a host that is not allowed to be connected, the connecting unit selects a host that is different from specified host as the next destination host from among the hosts capable of establishing a communication path with the communication device, and connects the communication device to the next destination host.

11. The communication device according to claim 1, further comprising a communication interface that is designed to be used for a point-to-multipoint network on which a single host is connected to a plurality of devices, wherein the communication interface is a wireless universal serial bus.

12. A communication method that is configured to be executed in a communication device that communicates as a device with a plurality of hosts, the communication method comprising:
    connecting the communication device to a destination host from among the hosts capable of establishing a communication path with the communication device by establishing the communication path to the destination host using host identification information that is received, in establishing connections with the host, from the host for identifying each of the hosts, and device control information that is used for uniquely identifying the communicating device;

disconnecting the communication device from the destination host;

controlling to disconnect the communication device from the destination host at the disconnecting and to connect the communication device to a next destination host from among the hosts at the connecting to switch the hosts sequentially;

creating a possible destination list information including the hosts capable of establishing the communication path with the communication device; and measuring a distance between the communication device and each of the hosts capable of establishing the communication path with the communication device, wherein:

the connecting selects a host from among the hosts in the possible destination list information as the next destination host, and connects the communication device to the next destination host, and the creating creates the possible destination list information so that the hosts are arranged in an ascending order of the distance measured.

13. A communication device that communicates as a device with a plurality of hosts, the communication device comprising:

a connecting unit that connects the communication device to a destination host from among the hosts capable of establishing a communication path with the communication device by establishing the communication path to the destination host using host identification information that is received, in establishing connections with the host, from the host for identifying each of the hosts, and device control information that is used for uniquely identifying the communicating device;

a disconnecting unit that disconnects the communication device from the destination host; and a control unit that controls to cause the disconnecting unit to disconnect the communication device from the destination host and cause the connecting unit to connect the communication device to a next destination host from among the hosts to switch the hosts sequentially, wherein the connecting unit selects a host having a shortest distance from the communication device as the next destination host, and connects the communication device to the next destination host.

14. The communication device according to claim 13, further comprising a request receiving unit that receives a request from the destination host, wherein when the request receiving unit receives a request for disconnecting the communication device from the destination host, the disconnecting unit disconnects the communication device from the destination host.

15. The communication device according to claim 13, wherein the disconnecting unit periodically disconnects the communication device from the destination host.

16. The communication device according to claim 15, wherein the disconnecting unit extends an interval at which the destination host is disconnected periodically based on communication usage information indicative of communication relation between the communication device and each of the hosts.

17. The communication device according to claim 15, further comprising an instruction receiving unit that receives an instruction from a user, wherein when the instruction receiving unit receives an instruction for specifying an interval at which the destination host is disconnected periodically, the disconnecting unit disconnects the communication device from the destination host every time specified interval passes.

18. The communication device according to claim 13, further comprising an instruction receiving unit that receives an instruction from a user, wherein when the instruction receiving unit receives an instruction for switching the hosts, the disconnecting unit disconnects the communication device from the destination host based on received instruction.

19. The communication device according to claim 13, wherein a creating unit creates a possible destination list information including the hosts that are arranged in a certain order based on a predetermined manner, and the connecting unit selects a host from among the hosts in the possible destination list information based on the certain order as the next destination host, and connects the communication device to the next destination host.

20. The communication device according to claim 13, further comprising an instruction receiving unit that receives an instruction from a user, wherein when the instruction receiving unit receives an instruction for specifying a host from among the hosts in a possible destination list information as the next destination host, the connecting unit selects specified host as the next destination host, and connects the communication device to the next destination host.

* * * * *